Nov. 3, 1953    W. P. MASON    2,658,186
PRISMATIC DIRECTIONAL AND OBJECT LOCATING SYSTEM
Filed March 12, 1942    4 Sheets-Sheet 1

INVENTOR
W. P. MASON
BY
H. O. Wright
ATTORNEY

Nov. 3, 1953 W. P. MASON 2,658,186
PRISMATIC DIRECTIONAL AND OBJECT LOCATING SYSTEM
Filed March 12, 1942 4 Sheets-Sheet 2

INVENTOR
W. P. MASON
BY
H. O. Wright
ATTORNEY

Nov. 3, 1953     W. P. MASON     2,658,186
PRISMATIC DIRECTIONAL AND OBJECT LOCATING SYSTEM
Filed March 12, 1942     4 Sheets-Sheet 3

INVENTOR
W. P. MASON
BY H. O. Wright
ATTORNEY

Nov. 3, 1953 W. P. MASON 2,658,186
PRISMATIC DIRECTIONAL AND OBJECT LOCATING SYSTEM
Filed March 12, 1942 4 Sheets-Sheet 4

FIG. 7

INVENTOR
W. P. MASON
BY
H. O. Wright
ATTORNEY

Patented Nov. 3, 1953

2,658,186

UNITED STATES PATENT OFFICE 2,658,186

PRISMATIC DIRECTIONAL AND OBJECT LOCATING SYSTEM

Warren P. Mason, West Orange, N. J., assignor to Bell Telephone Laboratories, Incorporated, New York, N. Y., a corporation of New York Application March 12, 1942, Serial No. 434,396

14 Claims. (Cl. 340—6)

This invention relates to directional systems, such as object-locating or detecting systems, navigation aiding systems and the like, employing prismatic wave energy transmitting or receiving devices. More particularly, it relates to systems for locating or detecting objects, obstacles, etc., by compressional or radio wave energy which may originate at or be reflected from the object to be detected, the systems employing prismatically directive transmitting or receiving devices to afford directional indications and thus eliminate in part or entirely the mechanical manipulation of directive devices to afford directional indications. A particular application to directive communication systems is also described.

Objects of the invention are to provide aids to navigation of mobile craft, to facilitate the detection and location of hostile craft and to provide systems for accomplishing these objects which require little or no mechanical scanning.

A particular object is to provide an improved method of detecting the direction from which noise vibrations impinge upon a receiving device.

Another object is to provide a unique directional communication system employing a prismatic directional device to direct communication channels to particular desired stations of a plurality of stations.

A further object is to provide submarine searching systems which will substantially eliminate tedious manipulation of searching equipment and will greatly increase the effectiveness of submarine searching operations by increasing the ease and speed with which they can be effected.

An additional object is to provide submarine searching apparatus and systems which will be substantially free from interference caused by noise originating on the searching vessel itself so that the latter will not be hampered in its search by a necessity to slow down so that its own engines' noises will not mask the noises of the craft being sought.

Further objects will become apparent during the following description of preferred illustrative embodiments of the invention and from the appended claims.

This invention, in a major aspect, is directed toward the more practicable solution of the important and difficult problem of locating enemy craft, particularly submerged submarines. Compressional wave radiating and receiving apparatus of the prior art has usually presented the awkward problem of mechanically scanning point by point the area to be searched by directive radiating and receiving members which have been, in general, bulky and difficult to manipulate. Prior art devices have, in general, not afforded as high a degree of directivity as is desirable, a particular difficulty, for example, being that propeller noise from the searching vessel itself interfered with and masked noises from the hunted craft. In addition to this, the necessity of mechanically pointing the directive radiating and receiving devices led to many practical difficulties and together with the limitations imposed by propeller noise made it necessary in many intances to bring the searching craft to a very slow speed and, frequently, pointing could be effected only by pointing the whole vessel. Also with many prior art systems it is not possible to detect a submarine passing beneath the searching vessel. These difficulties naturally greatly reduced the efficiency and expedition with which submerged vessels could be located and followed.

By devising systems employing prismatic radiating and receiving structure, the necessity of mechanically pointing a directive device can be largely obviated and the rapidity with which the desired areas may be scanned can be greatly increased. Furthermore, the majority of the devices employed in systems of the invention are stationary with respect to the vessel on which they are mounted and they can be streamlined. Since devices of the invention can largely eliminate interference from the propeller noises of their own craft, the latter can proceed at any speed desired without interfering with the efficacy of the searching operation.

For a submerged submarine in motion, the propeller noise is the usual telltale indication sought to be detected. Since noise comprises a very broad band of frequencies and a prismatic receiving device selects for each angle of approach thereto a particular frequency, it is merely necessary to note the frequency being received in order to obtain an indication of the angle at which the noise is approaching the receiving prism. If several frequencies are being received, it is an indication of several sources of noise at different directions, the respective directions being indicated by the respective values of the received frequencies. A frequency analyzer and an indicating device which will, in effect, plot each received frequency on a base scale representing the angle of approach will then suffice to indicate the presence of and direction to noise sources within the range of the receiving system.

For harbors, coastal waterways and narrow channels, it is practicable to submerge prismatic receiving devices at suitable intervals, preferably anchored and associated with buoys floating on the surface carrying small radio transmitting sets, the radio carrier of which is modulated by low frequencies corresponding with those of the sound received by the prismatic receiving device. By noting the modulations of several successive buoy transmitters, the position and course of a moving submarine relative thereto can be readily observed on surface craft, such as submarine chasers, and steps can then be taken to intercept and destroy the submarine.

A further problem, solutions for which are described hereinafter, is that of detecting the presence and location of inert objects such as submarines lying in wait with still engines. Since such objects radiate no compressional wave or other readily detectable energy, it is most feasible to project energy over the area or region to be surveyed and to receive reflections of such energy from objects such as submarines upon which the energy impinges. Systems employing prismatic radiators or receivers or both are also of substantial value in such systems. The energy employed can again very conveniently be noise, comprising substantially all frequencies within the pass-band of the prismatic device employed. Either a prismatic radiator can be employed, and the frequencies radiated thus each given a particular direction of radiation so that if reflections of a particular frequency are received upon a non-directive receiving device, the known direction of propagation of the particular frequency will indicate the direction of the reflecting object from the transmitter, or the band of noise frequencies can be radiated to entirely cover the area to be explored and a prismatic receiving device can then be employed and the frequencies received by it will each indicate a reflecting object at a particular angle with respect to the receiver. Pulses of noise can be transmitted and the receipt of the several reflections may be timed to provide distance as well as directional indications with respect to reflecting objects.

Several types of indicating devices and arrangements for the various forms of directive systems of the invention are also shown and described hereinafter as well as the application of the principles of the invention to directive transmission of intelligence for communication or for the navigation of mobile craft.

The arrangements and principles of the invention will be more readily understood in connection with the detailed description of illustrative embodiments given below in conjunction with the accompanying drawings, in which:

Fig. 4 illustrates the use of prismatic receivers submerged and associated with buoy type radio transmitters for the detection and location of submarines, in harbors, channels and the like;

Figure 1:
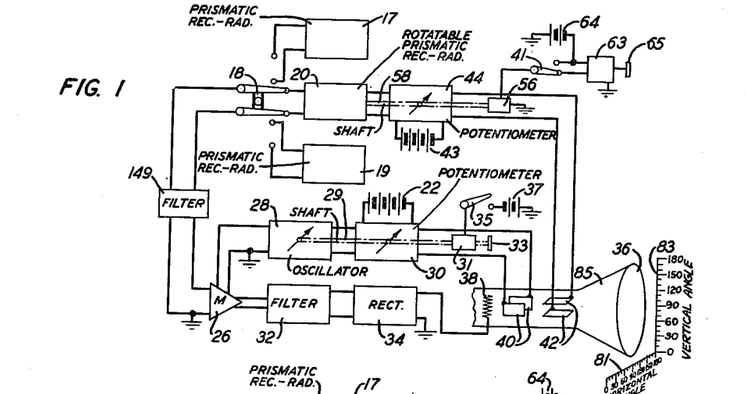
Fig. 1 illustrates in block diagrammatic form a system of the invention in which a plurality of compressional wave prismatic receivers are employed, in conjunction with a frequency analyzing circuit and an indicator to provide indications of the presence and direction of noise sources.
Figures 2, 3A:
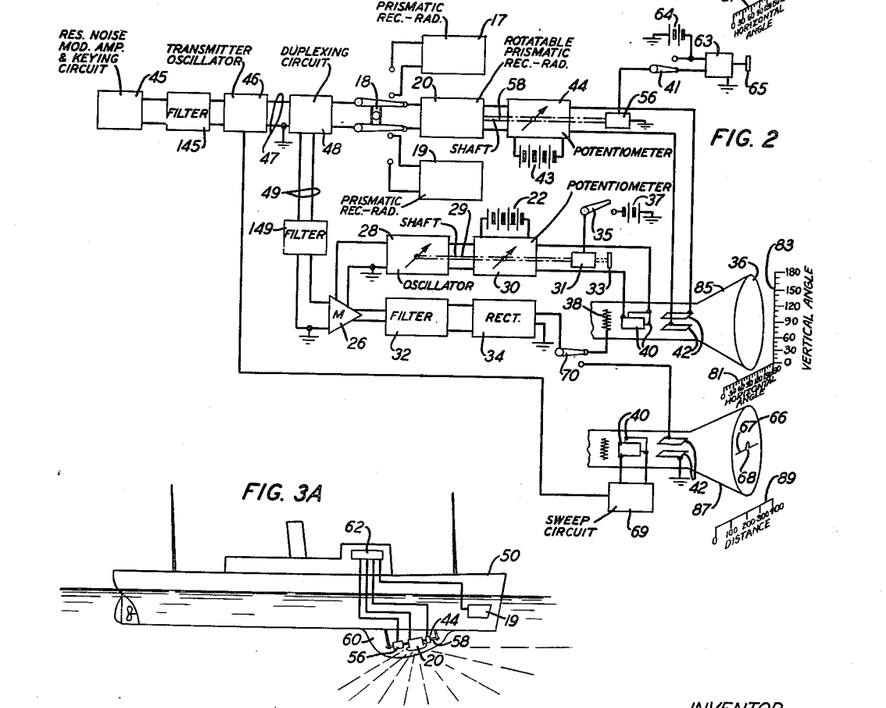
Fig. 2 illustrates in block diagrammatic form a system of the invention for transmitting compressional wave noise energy and receiving reflections thereof to provide indications of the presence and direction of reflecting objects.
Figs. 3A and 3B illustrate an arrangement of prismatic devices on a marine craft suitable for use in systems of the types of Figs. 1 and 2 for submarine detection and object location.
Figure 3B:
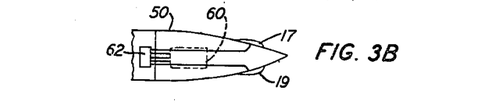

In more detail in Fig. 1, one of the three compressional wave prismatic receiver-radiators 17, 19 or 20 is selected by switch 18 to receive compressional wave energy from a predetermined area. For example, they may be mounted submerged on the sides and keel of the prow of a marine craft as illustrated in Figs. 3A and 3B so that all compressional wave vibrations in the water approaching from the sides of the craft or from beneath the craft will strike the receiving surface of one of the prisms.

Receiver-radiators 17, 19 and 20 are preferably of the multicrystal Rochelle salt piezoelectric type described in detail in my copending application, Serial No. 431,558, filed February 19, 1942, relating to "Prismatic Compressional Wave Radiators and Receivers," now United States Patent 2,404,391, granted July 23, 1946, comprising a plurality of rows of piezoelectric crystals, successive rows being shunted across successive shunt arms of a multisection electrical wave filter which passes the range of frequencies of interest. Such devices are characterized by prismatic directive properties which are a function of frequency within the frequency range of interest and spread the range as a spectrum if transmitting it, or selectively receive frequencies within the range of interest only if they impinge upon the receiver at a particular predetermined angle for each particular frequency.

For purposes of illustration it is assumed that these receiver-radiators pass the frequency band between 18 and 24 kilocycles which is commonly employed in submarine signaling systems.

As described in my above-mentioned copending application, such a receiver can readily be constructed to cover a horizontal range as great as 180 degrees if desired and a vertical range of approximately 10 degrees which will suffice to detect noises from submarines at normal depths and at reasonable distances from a surface craft. In order to be able to detect and follow submarines close to the surface vessel, or passing under it, it is desirable to be able to cover the area beneath the ship also and the mechanical arrangement of the special mounting of prism 20 on a rotatable shaft 58 for this purpose is also shown in Figs. 3A and 3B.

In Fig. 1 the output of one of the receiver-radiators 17, 19 or 20 is selected by switch 18 and introduced through filter 149 which passes frequencies within the band of interest but excludes extraneous interfering frequencies, into modulator 26 where it is combined with the output of variable heterodyne oscillator 28 which furnishes a heterodyne frequency varied periodically over the range of 118 to 124 kilocycles, so that any frequency within the range of 18 to 24 kilocycles, as received by receiver-radiator 17, 19 or 20 will produce a side-band frequency or "beatnote" of 100 kilocycles at some point in the frequency range of the heterodyne oscillator, and the 100-kilocycle side-band will pass through filter 32. The frequency variation can be continuous under the drive of motor 31 from battery 37, switch 35 being closed, or it can be manually controlled by handwheel 33, with switch 35 open, so that particular reflections can be examined closely.

The output of filter 32 is rectified by rectifier 34 and employed to operate an indicator, in this instance a cathode ray tube 85 having a target 36 and a control anode 38 which latter is employed in the present instance to substantially increase the intensity of the cathode ray beam upon the receipt of a signal in accordance with the rectified output of device 34.

The beam of the cathode ray tube is deflected horizontally by a variable voltage obtained through potentiometer 30 from battery 22 which voltage is varied periodically with the frequency changes of heterodyne oscillator 28 as indicated. The successive horizontal positions of the beam of the cathode ray oscilloscope will, therefore, correspond with successive frequencies in the range of 18 to 24 kilocycles which, in turn, correspond with successive directions of reception of the prismatic receiver-radiator 18, 19 or 20 as selected by switch 18. A scale 81 associated with target 36 enables the observer to read the horizontal angle of reception corresponding to each signal received.

If it is desired to sweep a greater vertical angle than 10 degrees, as for scanning the area beneath a searching craft, the receiver-radiator 20 can be rotated or oscillated on a shaft 58 through any desired vertical angle and a second potentiometer 44 can provide a variable voltage to vertical deflecting plates 42 from a battery 43 to deflect the beam of cathode ray oscilloscope 36 vertically in synchronism with the turning motion of the receiver-radiator 20, whereby a pattern of indications, showing the horizontal and vertical angular directions of submarines or other noise sources within the area scanned, will be obtained. A vertical scale 83 is also associated with target 36 to enable the observer to read the vertical angle corresponding to each signal received.

As indicated in Fig. 3A, the shaft 58 carrying receiver-radiator 20 is preferably power-actuated as by a motor 56 driven from battery 64, with switch 41 placed in its upper position to make direct connection to the battery, the motor 56 being arranged in a manner well known in the art to reverse its direction of rotation after turning through the desired arc. Alternate manual remote control is provided by a selsyn or similar well-known remote control arrangement including unit 63 which can be connected to the driving motor 56 by throwing switch 41 to the position shown in Fig. 1. Unit 63 is then turned by handwheel 65 and motor 56 duplicates the movements imparted to unit 63, to permit detailed observation of signals of particular interest without sweeping through the entire arc normally covered.

The system of Fig. 2 differs from that of Fig. 1 in the addition of a transmitter oscillator 46, which is modulated or actuated by resistance noise passed by filter 145 from a resistance noise modulator 45, and a duplexing circuit 48 which provides for alternately connecting the transmitter 46 and the modulator 26 to the prismatic receiver-radiator 17, 19 or 20 as selected by switch 18. Transmitter oscillator 46 obviously need operate only during transmitting intervals. Modulator 45 can conveniently, therefore, furnish relatively short pulses of resistance noise energy to actuate the transmitter. The duplexing circuit 48 may be of the type well known in the art, which short-circuits the receiving modulator 26 input when the transmitter operates and opens it when transmission ceases. The impedance of transmitter 46 should be high when it is not operating so that it will not appreciably decrease the received signals reaching modulator 26. Distance to objects of particular interest may readily be ascertained by determining the reflection time of regularly emitted pulses using any of the several well-known pulse-reflection circuits of the art. In accordance with one well-known system, when a signal of particular interest has been selected switch 70 is thrown to its lower position to place the output of rectifier 34 on the vertical deflecting plates 42 of a second cathode ray oscilloscope 87. The horizontal deflecting plates 40 of this oscilloscope are connected to a sweep circuit 69 which is synchronized with the outgoing pulses to deflect the ray uniformly with time, as indicated by trace 67, across the target 66. The received reflection produces a vertical deflection such as 68 the lateral position of which indicates the distance to the reflecting object, which may be read from scale 89.

With oscillator 46 deenergized, the system of Fig. 2 may of course be used for detecting noise sources in the same manner as for the system of Fig. 1. In the system of Fig. 2 receiver-radiators 17, 19 and 20, are of course, alternately used as receivers and as radiators as required for the operations it is desired to carry out.

In Figs 3A and 3B a suitable physical arrangement of the plurality of prismatic receiver-radiators 17, 19 and 20 on the hull of a power propelled marine craft is illustrated. Devices 17 and 19 are arranged on the port and starboard sides, respectively, of the prow of the craft and taken together will directively receive or transmit compressional wave energy of proper frequencies in view of their prismatic properties within a vertical arc of approximately 10 degrees from the horizontal and from substantially any horizontal direction save for a small arc toward the rear of the vessel, which purposely includes the position of the propeller of the craft itself so that noises therefrom will not be efficiently received. These devices can offer substantially streamlined surfaces to the water in order to reduce the drag of the water upon them.

Prismatic receiver-radiator 20 is mounted in a streamlined nacelle 60 on the keel of the craft. It is rotatable at least through an arc of substantially 170 degrees so that it may be employed to scan the area beneath the craft for the purpose of detecting submarines or other objects over which the craft may be passing, or which may, because of depth and proximity, not be within the vertical angle of receptivity of devices 17 and 19. The nacelle should be filled with sea water or a fluid of comparable compressional wave impedance characteristics. The nacelle itself should freely pass compressional wave energy. The remainder of the locating system 62 on the craft can, of course, comprise the remainder of the apparatus shown in either of the Figs. 1 and 2. The system of Fig. 2 is naturally preferable since it permits detection of inert objects as well as of noise sources.

Figure 4:
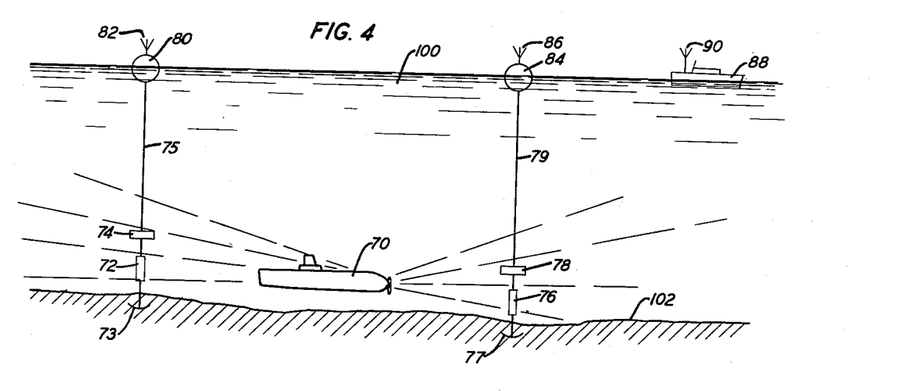

In Fig. 4, two submarine detecting stations are shown and comprise prismatic compressional wave receiving devices 72, 74, 76 and 78 which are suspended, submerged in water 100, on cables 75 and 79, as shown respectively, the anchors 73 and 77 holding the lower ends of the cables in the bottom 102 and the buoys 80 and 84 supporting the upper ends thereof, respectively. Devices 74 and 78 are prismatically directive in the horizontal plane and devices 72 and 76 are prismatically directive in the vertical plane. The particular frequencies received by these devices will, of course, depend upon the respective angles at which the noise emitted by the submarine 70 impinges upon them and they will generate currents the frequencies of which will correspond to the components of the noise to which they respond, respectively. All of the receiving devices should obviously discriminate against noise originating at or near the surface of the water 100. Buoys 80 and 84 include small radio transmitters which emit carrier radio waves of distinctive frequencies, from antennas 82 and 86, respectively. Cables 75 and 79 include conductors serving to connect devices 72, 74, 76 and 78 to the transmitters in their respective buoys to modulate the carrier waves above mentioned, with their respective low frequency output currents. Additional detecting stations including buoys, cables, prismatic receivers, anchors, transmitters and antennas, as for the two detecting stations above described, are spaced at convenient intervals about an area to be patrolled, for example, a harbor or ship channel. The area can then be patrolled by carrying a radio receiving system, including antenna 90 on a surface craft 88. The radio receiving system can, in turn, be tuned to the carrier waves emitted by the successive buoys. Upon noting the low frequency modulations on each carrier an observer on the patrol craft can deduce therefrom the position and course of the submarine and can initiate, or direct, appropriate action to capture or destroy it.

Figure 5:
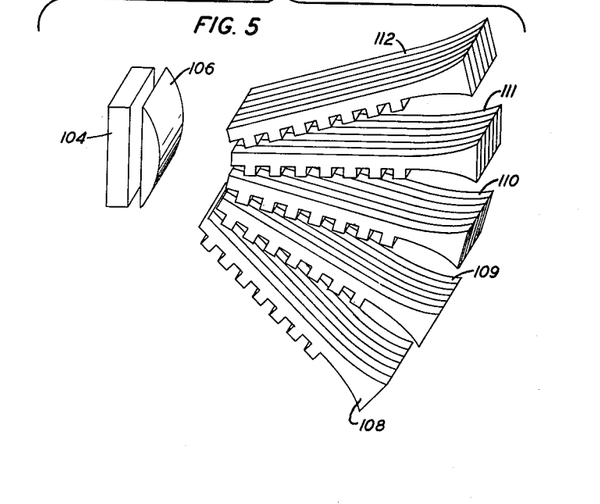
Fig. 5 illustrates an arrangement providing compound prismatic properties to provide the distribution of a frequency spectrum over an area or the equivalent of point by point scanning of an area without mechanical manipulation of the directing devices.

Obviously, the two prismatic receivers at each detecting station can be replaced by a single compound compressional wave prismatic receiver, the principles of which will become apparent in the discussion of Fig. 5 to be described presently.

Obviously, also, similar arrangements of detecting stations can readily be devised for other purposes than detecting submarines. For example, prismatic receivers designed for use in air can be placed at advanced points in an air-raid defense system and connected to modulate low-power radio carrier waves which can be received at convenient observation points whereby timely warnings of the direction of approach of hostile aircraft can be obtained. Such systems will in some measure assist in overcoming the main objection to sonic aircraft detecting systems i. e., because of the time required for the sound of aircraft to reach the ground the craft have passed well beyond the observation point by the time the sounds have been received and interpreted.

In Fig. 5 the essential elements of a compound prismatic (or doubly prismatic) receiving or radiating system is shown. A first or primary prismatic radiator or receiver 104 serves to impart directivity vertically to several groups of frequencies which together comprise the entire band of frequencies employed. Thereafter, horizontal directivity to the frequencies within each group is imparted by a plurality of secondary prismatic devices 108 to 112, inclusive.

Device 104 is preferably of the multicrystal, filter-coupled type described in detail in my copending application entitled "Prismatic and High Power Compressional Wave Radiators and Receivers," Serial No. 431,558, filed February 19, 1942, which matured into United States Patent 2,404,391, granted July 23, 1946, in which a plurality of rows of piezoelectric crystal vibrators are coupled to successive sections of a multisection electric wave filter, the phase per section of the filter varying between prescribed limits as the frequency is varied between the limits of the frequency range employed.

In the system of Fig. 5 the energy emitted directively from the prismatic device 104 is focused by cylindrical lens 106 on the inputs of a secondary series of prismatic devices 108 to 112, inclusive, the total frequency range employed being in effect subdivided into five approximately equal parts and device 104 and lens 106 being proportioned so that these five equal parts are distributed vertically in the order of their mean frequencies to the inputs of the five secondary series of prismatic devices 108 to 112, respectively. Small portions of the frequency range will, of course, be partially or wholly ineffective because they are directed too close to the edges of their respective secondary prismatic devices or into intervals between successive secondary prismatic devices.

To effect this vertical distribution by parts, of the total frequency range employed, the prismatic device 104 is provided with a coupling filter the sections of which have a relatively smaller rate of change of phase with frequency over the range employed than where a more complete and distinct separation of the individual frequencies of the range employed is desired. One obvious method of obtaining a smaller rate of change of phase with frequency is to broaden the transmission band of the coupling filter so that the limiting (or extreme lower and upper) frequencies passed are well beyond the lower and upper frequencies, respectively, of the frequency range to be employed. This follows, of course, from the fact that an electrical wave filter section has substantially the same total difference in phase shift in passing from its lower to its upper cut-off frequencies regardless of the width of its band.

If a single primary prismatic device such as 104 is employed, it again follows that the total vertical angular distribution to be obtained over the frequency range employed must be considerably less than 180 degrees since only a portion of the total phase shift per section of the coupling filter is to be employed, as above explained.

If a greater vertical angle of distribution is desired, two or more systems of the type illustrated in Fig. 5 may, of course, be employed and aligned so that their ranges are contiguous and together cover the entire vertical angle desired.

The secondary prismatic devices 108 to 112, inclusive, serve, as above mentioned, to impart horizontal directivity, i. e., to spread horizontally, the several frequencies of the frequency bands directed to them, respectively, by the device 104 and lens 106. These secondary prismatic devices can conveniently be of similar design to the device of Fig. 12 of my copending application entitled "Compressional Wave Directional, Prismatic and Focusing Systems," Serial No. 425,710, filed January 6, 1942, now United States Patent 2,406,391, granted August 27, 1946, except that, obviously, compressional wave energy is projected directly into them from prism 104 instead of being generated in them by piezoelectric vibrators as shown in Fig. 12 of my above-mentioned application. For the secondary prismatic devices also it will generally be desired to spread the frequency band through an arc considerably less than 180 degrees so that only the central portion of the pass-band of the filter structure incorporated in the prismatic device will be employed and a smaller number of units per secondary device will suffice than where a wider angular distribution and more highly directive properties are necessary.

From the above description it is apparent that the system of Fig. 5 results in spreading the frequencies of the range employed, vertically and horizontally so that the device may be employed to cover an area with compressional wave energy the energy being spread prismatically in the two directions so that within the area a different frequency will be found to impinge upon each unit of area. The size of the unit of area in which a particular frequency will be encountered will of course be determined by the over-all characteristics of the compound prismatic device, as will become more apparent hereinafter.

Conversely, when employed as a receiving device in a detecting system, such as that of Fig. 4, for example, the position of a source of noise within the area can be determined simply by determining the frequency of the component which is received by the system of Fig. 5.

As an alternative to employing the prismatic device 104 together with a lens 106, the prismatic device 104 can be constructed with its emitting unit surfaces arranged to lie on the surface of a cylinder the axis of which is coincident with a near end of a secondary prism, such as 111, which is in the normal plane for propagation with the radiating units driven in phase. The principles involved are, of course, identical with those discussed in my copending application of January 6, 1942, mentioned above, with respect to focusing prismatic devices.

A compound (or doubly) prismatic system for electromagnetic waves employing the simple electromagnetic prisms of my copending application entitled "Pipe Antennas and Prisms," Serial No. 381,236, filed March 1, 1941, now United States Patent 2,408,435, granted October 1, 1946, can readily be assembled in the light of the above disclosures which will be closely analogous to the compressional wave system of Fig. 5 described above.

Figure 6:
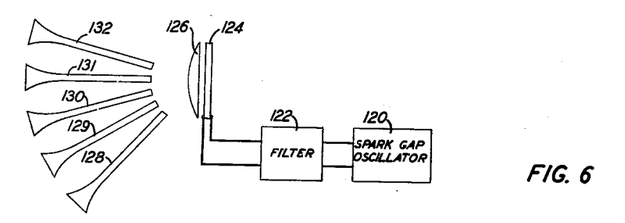
Fig. 6 is a further system of the invention employing compound prismatic radiation of electromagnetic waves and broadly directional reception for object location.
Figure 7:
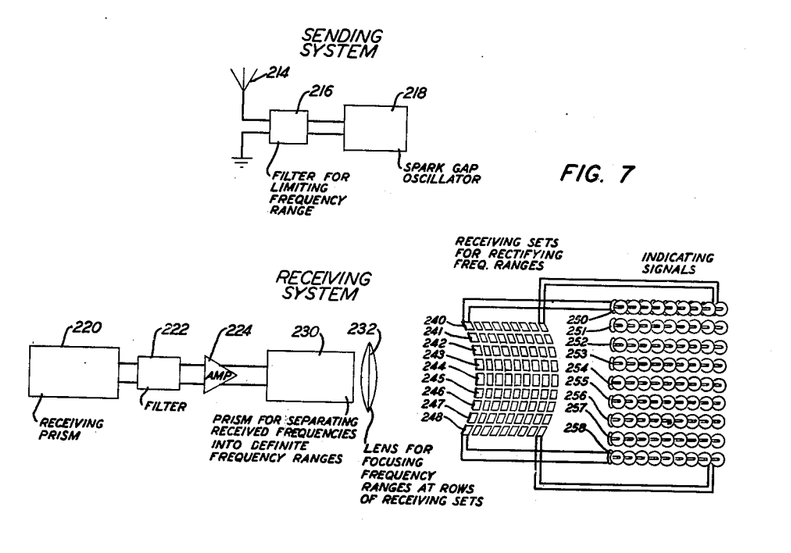
Fig. 7 is a further system of the invention employing non-directional transmission and compound prismatic reception of electromagnetic waves for object location.
Figure 8:
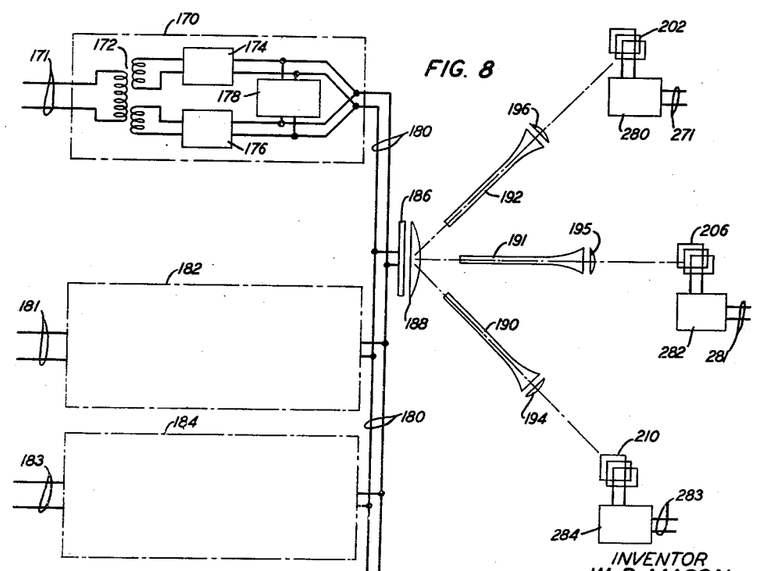
Fig. 8 is a system of the invention applying prismatic transmission and broadly directional reception for a selective communication or navigational system.

Electromagnetic wave object-location, navigational or communicating systems employing compound or doubly prismatic radiating devices are shown in Figs. 6, 7 and 8 and will now be described.

In Fig. 6 a spark-gap oscillator 120, of any of numerous types well known in the art, generates a broad band of ultra-high frequencies. The output of oscillator 120 is passed through filter 122 which selects a band of frequencies appropriate for use in the system. The primary electromagnetic prism 124 can be, by way of example, a plurality of prisms of the type shown in Fig. 1 of my above-mentioned copending application Serial No. 381,236, now Patent 2,408,435, arranged adjacent to each other with their orifices all facing to the left. Prism 126, which may be of beeswax, serves to focus the energy emitted by prism 124 on a line perpendicular to the plane of the paper the vertical position of which is determined by the direction in which the energy is radiated by prism 124. Secondary prisms 128 to 132 each comprise, for example, a plurality of wave guide filters of the type illustrated in Fig. 18 of my above-mentioned application and consisting of a wave guide with transverse members having orifices therein placed at regular intervals along the interior of the guide. In this instance, however, the holes in the side of the wave guide are omitted and the energy-absorbing termination is replaced by an electromagnetic horn radiator. Each of the secondary prisms 128 to 132, inclusive, then consists of a plurality of such wave-guide filter and horn structures aligned perpendicular to the plane of the paper and analogous in structure and arrangement to the compressional wave system secondary prisms described above. The secondary prisms are, of course, proportioned to laterally spread a particular portion of the total electromagnetic wave frequency range of the system so that again we have a system in which vertical distribution of frequency groups is effected by a primary prismatic device and horizontal distribution of the frequencies of each group is effected by a secondary prismatic device and the over-all effect is to cover an area, each unit of the area having directed to it a particular frequency within the range of the system.

For object-detection by the reflection method a receiving system, including loop antenna 140 which may be oriented to receive reflections from the area toward which energy is transmitted, a filter 142 to exclude frequencies outside the range transmitted, an amplifier 144, a series of filters including filters 146, 148, 150 to isolate reflections of different frequency, a like series of rectifiers including rectifiers 152, 154 and 156 to rectify the energy of each isolated frequency and an indicating device 158 having indicating units including units 160, 162 and 164 to indicate the reflected frequencies which are received, can be employed. The location of the indicating units 160, etc., on the face of the indicating device 158 can, of course, correspond to the location of points in the area toward which the respective frequencies are transmitted, which, upon reception after reflection, cause the operation of the particular, respective, units so that a glance at the indicating device 158 will suffice to show the number and relative positions in the area of a plurality of objects from which reflections are received.

The system of Fig. 7 may also be employed for object-location or similar purposes. In Fig. 7 a spark-gap oscillator 218 generates a wide band of ultra-high frequencies, a filter 216 selects an appropriate range of frequencies from the band generated by oscillator 218, antenna 214 radiates the frequencies selected by filter 216. Antenna 214 may be non-directive but is preferably broadly directive so that it may cover an appropriate area to be investigated. A compound (or doubly) prismatic device 220, similar to the combination of primary prism 124, lens 126 and secondary prisms 128 to 132, inclusive, of Fig. 6, by way of example, is employed in the system of Fig. 7 to receive reflections from a predetermined area of the energy emitted by antenna 214. Filter 222 serves to exclude frequencies outside the range emitted by antenna 214. Amplifier 224 amplifies the frequencies received and a second compound prismatic device 230 and lens 232 serve to distribute the amplified received reflected frequencies over an area covered by an assembly of small detecting units including units 240 to 248, inclusive, which upon being struck by a received reflected frequency, energize particular indicating units of a group including units 250 to 258, inclusive. As for the system of Fig. 6, the indicating units may be arranged to show at a glance the number and relative positions, within the area covered by the receiving compound prism 220, of objects from which reflections are obtained. Since all frequencies of the range passed by filter 216 are broadcast by antenna 214 over the area covered by receiving prism 220, all reflections will include all frequencies of this range. The prism 220, however, will discriminate with respect to angle of approach and will select a different frequency from each of a number of reflections approaching at different angles, the particular frequency in each case corresponding to the particular angle of approach.

In Fig. 8 another form of system employing a compound or doubly prismatic device is shown. As will presently become apparent systems of this type can be employed for switching in radio navigational and communication systems in which intelligence bearing channels occur at high carrier frequencies or with appropriate equivalent lower frequency devices they can be employed in the ordinary "central office" type switching systems for interconnecting pairs of a plurality of intelligence bearing channels.

Alternatively, systems of the type illustrated in Fig. 8 can, obviously, be used to aid navigation by definitely orienting the transmitting device so that a mobile craft equipped with a suitable receiver can determine its direction from the transmitter by noting the frequency of the signal received. If the two-way communicating feature, to be described presently, is employed the parties at both stations can determine the direction to the other station by noting the frequency at which they are operating.

For a voice-frequency radio-beam switching system, providing two-way communication over a plurality of channels having particular known directivities, with reference to Fig. 8, it is desired, for example, to connect any one of a plurality of incoming voice frequency two-conductor lines 171, 181, 183, to any one of a plurality of outgoing voice frequency two-conductor lines 271, 281, 283. Each incoming line, for example, line 171, connects through a suitable terminal set 170 including transformer 172 with a modulator 174 and a demodulator 176 connected in parallel. Dialing pulses, indicating the desired outgoing "line" to which the subscriber wishes to make connection, actuate the oscillator 178 and tune it to a frequency such that the double electromagnetic prismatic system including primary prism 186, focusing lens 188, secondary prisms 190 to 192, and secondary focusing lenses 194 to 196, direct and focus the radio beam on the receiving antenna of the desired outgoing line, for example, antenna 210. Speech from line 171 modulates the carrier generated in oscillator 178, receiving terminal set 284 includes a modulator, demodulator and transformer equivalent to and connected as are the modulator 174, demodulator 176 and transformer 172 of set 170. The carrier and speech side-bands generated in oscillator 178 are then transmitted to terminal set 284 which demodulates the combination and sends the speech currents out on line 283 as desired. When the subscriber on line 283 talks, some of the carrier from oscillator 178 being received in terminal set 284 is impressed on the plate of the modulator and is modulated by the speech currents from line 283. This modulated carrier is radiated from antenna 210 and, since the prism is focused on the antenna, it is picked up by the prism and reaches terminal set 170 where it is demodulated and goes back over voice frequency line 171 to the calling subscriber.

Any other combination of lines being used at the same time will also return speech to the demodulator of line 171 but since the carriers of any other such lines will be of substantially different frequency from that of oscillator 178, interfering speech energy when demodulated will fall into a frequency range outside the voice frequency range and will not be heard by the party on line 171. Several, or all, incoming lines can thus be connected to different outgoing lines and maintain conversations simultaneously without interfering with each other.

The system will function equally well if the incoming lines are operating at carrier telephone frequencies. In such a case the controlling oscillator is biased to take into account the set frequency of the incoming carrier wave.

A central office handling 10,000 lines through one doubly prismatic device requires a degree of "separation" equivalent to a 100-line television system. This, of course, does not represent a severe requirement. In Fig. 8 only three incoming lines and three outgoing lines and the portions of the prismatic device required to interconnect them are indicated. The remainder of the system for a very much larger number of lines up to 10,000, as above mentioned, would, of course, involve only a duplication of the parts shown with due regard, naturally, for the distinguishing frequency differences required to afford separation of each channel from all others.

In the specific system suggested above in connection with Fig. 8 the "radio links" contemplated are relatively very short. Obviously the same principles could readily be applied to a system in which much longer radio links were employed though in such a system the number of links would probably be limited by considerations of a practical nature to much less than 10,000. For example, a fixed land station can be arranged to communicate selectively with a plurality of marine vessels and aircraft following designated lanes of travel. By calling in with a band of frequencies wide enough to include the frequency corresponding to its direction each craft can be located as to direction and subsequent communication can be carried through on the most appropriate frequency. By the use of focusing devices as suggested in Fig. 8 the distance of a particular craft can be established and thus its position can be definitely determined.

Alternatively with the master station placed on the flagship a fleet of marine craft with cooperating air patrol craft, can maintain a specified formation, each craft maintaining itself at the focal point for an energy beam of a particular predetermined frequency. For military uses such systems should employ the minimum power essential for operation. The signals can of course be intermittent, if desired.

The above arrangements are illustrative of particular applications of the principles of the invention. Numerous other arrangements embodying the principles of the invention can readily be devised by those skilled in the art. The scope of the invention is defined in the following claims.

What is claimed is:

1. In a compressional wave system for the detection and location of noise emitting sources within a predetermined area, a compressional-wave prismatic receiving device adapted to directively receive from said area any frequency of a substantial band of frequencies within the frequency spectrum of the noise sources to be detected, each frequency within the said band being efficiently received by said receiving device only if it approaches said receiving device from a particular angle, frequency analyzing means for determining the frequencies received and means for indicating which frequencies within the said band are being received whereby the number and angular direction of noise sources within said area can readily be determined.

2. The compressional wave system of claim 1, the said means for determining the frequencies received comprising a modulator into which the received frequencies are introduced, a variable heterodyne oscillator, a band-pass filter passing substantially a single frequency, the frequency range of variation of said heterodyne oscillator including within it frequencies which when combined with any frequency within the band received by said prismatic receiving device will produce a beat-note frequency which will pass through the pass-band of said filter, the output of said heterodyne oscillator being introduced into said modulator, the output of said modulator being introduced into said filter, means for indicating the passage of energy through said filter and for simultaneously indicating the instantaneous frequency of said heterodyne oscillator whereby the number and angular direction of noise sources within the area covered by said prismatic receiving device are readily determined.

3. The compressional wave system of claim 1, the means for indicating which frequencies are being received comprising a cathode ray indicator having a pair of horizontal deflecting plates and a control anode, the system including means for deflecting the beam of said cathode ray indicator horizontally in synchronism with the operation of the said frequency analyzing means, and means operatively interconnecting the said control anode and said frequency analyzing means for increasing the intensity of said cathode ray beam whenever said analyzing means obtains a positive indication of the presence of a received frequency whereby a line pattern of indications of points of increased intensity of said cathode ray is obtained, the number of said points corresponding with the number of noise sources and the lateral positions of said points indicating the angular direction of the respective noise sources with respect to the said prismatic receiving device.

4. In an object-detecting system, a prismatic radiator proportioned to prismatically radiate a particular spectrum of frequencies to cover a region in space, means for periodically energizing said radiator with the said particular spectrum of frequencies, means for receiving reflections of said radiated frequencies, and means for determining the frequencies of the received reflected components whereby indications of the number and respective directions of reflecting objects within the said region are obtained.

5. In an object-detecting system, a prismatic receiver proportioned to prismatically receive a particular spectrum of frequencies selectively from a predetermined region in space, means for radiating said spectrum of frequencies into said region and means for determining the frequencies of the respective reflected components of said spectrum radiated into said region which are received whereby indications of the number and respective directions of reflecting objects within the said region are obtained.

6. In an object-detecting system, the system of claim 4, said prismatic radiator and said receiving means both being rotatable about their respective longitudinal axes whereby a more extensive region may be investigated and the number and respective directions of reflecting objects within said more extensive region may be determined.

7. In a marine object-detecting system, a prismatically directive compressional wave receiver mounted on a rotatable longitudinal shaft, the shaft in turn being mounted beneath a marine craft substantially in a plane including the keel of the craft, the receiver being proportioned to prismatically receive a particular spectrum of compressional wave frequencies from points within a predetermined first area and to effectively exclude compressional wave frequencies from points within a predetermined second area including the area about the propellers of the craft, for all positions of said rotatable shaft whereby an extensive region beneath and to the sides of said vessel may be explored by rotating said shaft without interference from propeller noise from the craft itself and without requiring the slowing down or stopping of the driving engines of the craft itself.

8. In a system for detecting the presence and following the movement of submerged power-driven craft, a plurality of submerged prismatically directive compressional wave receivers and means for determining and observing the frequencies received by each receiver whereby the presence and movement of submerged power-driven craft may be detected and followed, respectively.

9. In an object-detecting system, a compound prismatically directive radiator comprising a primary prismatic device and lens, distributing in one direction a total frequency spectrum in portions to each of a plurality of secondary prismatic devices, the said secondary prismatic devices distributing their respective portions of said total frequency spectrum in a second direction whereby a substantial two-dimensional distribution of the energy of said spectrum is obtained.

10. In an object-detecting system, the radiator of claim 9 and means for receiving reflections of the energy radiated by said radiator and determining the frequency of the received reflections to obtain indications of the number and direction of reflecting objects in the area into which the radiator projects energy.

11. In an object-locating system, a radiator for prismatically distributing energy comprising a particular frequency spectrum over a large three-dimensional region, means for receiving reflections of said energy from reflecting objects within said region, means comprising a plurality of filters for separating received reflections on the basis of their respective frequencies, a plurality of signal devices connected to the output ends of said filters and arranged on an indicating panel in order corresponding to the relative positions from which the frequencies passed by their respective associated filters are received, each of said signal devices operating when a reflected component passes through its respective associated filter whereby a pattern of indications is formed on said panel by the operated signal devices which is representative of the number and directions of the reflecting objects within the said region.

12. In a system for detecting mobile noise emitting craft, a prismatically receptive means responsive to a particular different frequency of the noise for each of a wide range of particular different directions, respectively, and means for indicating the frequency received.

13. In an object-detecting system, a prismatic means for directively radiating energy of a broad band of frequencies each frequency of said range being radiated in a particular different direction, means for receiving reflections of said radiated energy and determining the particular frequencies of the received reflected energy whereby the direction of the reflecting objects may be ascertained.

14. In a system for detecting the direction and distance of objects within a particular area, means for periodically radiating energy pulses comprising a broad band of frequencies, each frequency of said range being radiated in a particular different direction, means for receiving reflections of said pulses, means for separating the receiving reflected pulses on the basis of frequency differences and means for timing the interval for each received reflected frequency between emission of the pulse and receipt of the particular reflection whereby the received frequencies indicate the respective distances of objects from which reflections are received.

WARREN P. MASON.

References Cited in the file of this patent

UNITED STATES PATENTS

| Number | Name | Date |
|---|---|---|
| 1,486,735 | Fessenden | Mar. 11, 1924 |
| 1,564,303 | Wold | Dec. 8, 1925 |
| 2,017,695 | Hahnemann | Oct. 15, 1935 |
| 2,169,304 | Tournier | Aug. 15, 1939 |
| 2,227,598 | Lyman et al. | Jan. 7, 1941 |
| 2,232,858 | Lane | Feb. 25, 1941 |

FOREIGN PATENTS

| Number | Country | Date |
|---|---|---|
| 291,124 | Germany | Aug. 1, 1919 |
| 297,996 | Germany | Aug. 27, 1919 |
| 570,526 | Germany | Feb. 16, 1933 |